US009893773B2

(12) United States Patent
Marzetta et al.

(10) Patent No.: US 9,893,773 B2
(45) Date of Patent: Feb. 13, 2018

(54) SYSTEM AND METHOD OF WIRELESS COMMUNICATION USING LARGE-SCALE ANTENNA NETWORKS

(75) Inventors: Thomas L. Marzetta, Summit, NJ (US); Alexei Ashikhmin, Morristown, NJ (US); Paul A. Polakos, Marlboro, NJ (US)

(73) Assignee: PROVENANCE ASSET GROUP LLC, Essex, CT (US)

( * ) Notice: Subject to any disclaimer, the term of this patent is extended or adjusted under 35 U.S.C. 154(b) by 121 days.

(21) Appl. No.: 13/238,329

(22) Filed: Sep. 21, 2011

(65) Prior Publication Data
US 2013/0070621 A1    Mar. 21, 2013

(51) Int. Cl.
*H04B 7/024* (2017.01)

(52) U.S. Cl.
CPC .................... *H04B 7/024* (2013.01)

(58) Field of Classification Search
CPC ...... H04W 24/00; H04W 72/04; H04L 12/26; H04L 27/28; H04B 7/024
USPC ....... 370/208, 252, 276, 277, 280, 310, 314, 370/334–336, 339, 491, 500
See application file for complete search history.

(56) References Cited

U.S. PATENT DOCUMENTS

| | | | | |
|---|---|---|---|---|
| 6,865,218 B1 * | 3/2005 | Sourour | ............... | H04B 1/7107 370/342 |
| 7,319,685 B2 * | 1/2008 | Kim | .................. | H04L 1/06 370/208 |
| 2005/0130684 A1 * | 6/2005 | Kim | .................. | H04L 1/06 455/464 |
| 2007/0040704 A1 * | 2/2007 | Smee | ................... | H04B 1/7107 340/981 |
| 2007/0189364 A1 * | 8/2007 | Wang | .................. | H04B 1/7105 375/148 |
| 2009/0225876 A1 * | 9/2009 | Sung | .................... | H04L 1/0045 375/260 |

(Continued)

FOREIGN PATENT DOCUMENTS

JP          2008109664 A          5/2008

OTHER PUBLICATIONS

Parkvall et al., The Evolution of LTE Towards IMT-Advanced, Journal of Communications, Academy Publishers, Oulu, FI, vol. 4, No. 3, Apr. 1, 2009, pp. 146-154.

(Continued)

*Primary Examiner* — Andrew Chriss
*Assistant Examiner* — Rasha Fayed
(74) *Attorney, Agent, or Firm* — Chiesa Shahinian & Giantomasi PC

(57) ABSTRACT

A communication method uses a distributed cell-free network of spatially independent service antennas. According to the method, pilot sequences are allocated to a user population of access terminals by an allocation procedure that imposes local relative orthogonality of pilot sequences. Channel coefficients for access terminals are determined by measuring allocated pilot sequences as received by each of the service antennas. In embodiments of the invention, the determination of channel coefficients is performed independently and the resulting channel coefficients are locally stored at the respective service antennas. At each service antenna, a processor independently uses locally stored channel coefficients to precode forward link signals or to at least partially decode reverse link signals.

15 Claims, 6 Drawing Sheets

(56) References Cited

U.S. PATENT DOCUMENTS

| | | | | |
|---|---|---|---|---|
| 2010/0202554 A1* | 8/2010 | Kramer | ............... | H04L 25/0224 375/285 |
| 2010/0303136 A1* | 12/2010 | Ashikhmin | .............. | H04B 3/32 375/222 |
| 2011/0249597 A1* | 10/2011 | Papadopoulos | ....... | H04L 5/0023 370/280 |
| 2012/0014476 A1* | 1/2012 | Kuchi | .................... | H04B 7/024 375/296 |
| 2012/0082258 A1* | 4/2012 | Nuzman | ................. | H04M 3/18 375/285 |
| 2012/0177001 A1* | 7/2012 | Gao | ..................... | H04B 7/0697 370/330 |
| 2013/0044610 A1* | 2/2013 | Zhao | .................... | H04B 7/0417 370/252 |

OTHER PUBLICATIONS

Dahlman et al., 3G Evolution: HSPA and LTE for Mobile Broadband, No. 1, Jan. 1, 2007, p. 485.
Ke-Lin et al., Channel Estimation and Equalization, in Wireless Communication Systems—From RF Subsystems to 4G Enabling Technologies, May 24, 2010, pp. 158-179.
Wright, Gregory, Energy Efficient Wireless: Three Shades of Green, May 1, 2011, retrieved from the Internet URL: http://bwrc.eecs.berkeley.edu/php/pubs/pubs.php/1709/GregWright.pdf, retrieved on Oct. 17, 2012, p. 4.
PCT International Search Report corresponding to PCT Application No. PCT/US2012/054356 filed Sep. 10, 2012, International Search Report dated Nov. 5, 2012, pp. 1-4.
PCT Written Opinion of the International Searching Authority corresponding to PCT Application No. PCT/US2012/054356 filed Sep. 10, 2012, Written Opinion dated Nov. 5, 2012, pp. 1-9.
D. Takahashi, "Steve Perlman's white paper explains "impossible" wireless tech", VentureBeat, Jul. 28, 2011, http://venturebeat.com, 7 pages.
T. L. Marzetta, "Noncooperative Cellular Wireless with Unlimited Numbers of Base Station Antennas", IEEE Transactions on Wireless Communications, vol. 9, No. 11, Nov. 2010, pp. 3590-3600.
S. Perlman, et. al., "Distributed-Input-Distributed-Output (DIDO) Wireless Technology A New Approach to Multiuser Wireless", Jul. 27, 2011, www.rearden.com, 19 pages.
F. Rusek, et. al., "Scaling up MIMO: Opportunities and Challenges with Very Large Arrays", accepted for publication in IEEE Signal Processing Magazine, 30 pages.
T. L. Marzetta, "MIMO System Having a Plurality of Service Antennas for Data Transmission and Reception and Method Thereof"; U.S. Appl. No. 13/155,733, Jun. 8, 2011, 40 pages.
Office Action dated Sep. 8, 2015, in connection with Japanese Patent Application No. 2014-549043, 11 pgs.

* cited by examiner

SYSTEM AND METHOD OF WIRELESS COMMUNICATION USING LARGE-SCALE ANTENNA NETWORKS

CROSS-REFERENCE TO RELATED APPLICATION

The subject matter of this patent application is related to the subject matter of the commonly owned U.S. patent application Ser. No. 13/155,733, filed by T. Marzetta et al. on Jun. 8, 2011 under the title "MIMO System Having a Plurality of Service Antennas for Data Transmission and Reception and Method Thereof." application Ser. No. 13/155,733 is hereby incorporated herein in entirety.

FIELD OF THE INVENTION

The invention relates to methods and systems of wireless communication that use multiple antennas to achieve improved network performance.

ART BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, a multiple array of transmit antennas sends a superposition of messages to a multiple array of receive antennas. The channel state information (CSI), i.e. the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (referred to herein as "access terminals" or "ATs") are served simultaneously in the same time-frequency slots by an even larger number of base station antennas or the like, which we refer to herein as "service antennas". Particularly when the number of service antennas is much greater than the number of ATs, such networks may be referred to as "Large-Scale Antenna Systems (LSAS)". Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

Although the theoretical studies are favorable, practical difficulties still stand in the way of a large, geographically extensive LSAS. One problem, among others, is how to make tractable the collection and processing of CSI gathered from many antennas, which may number in the hundreds or more, spread over a geographical area that may cover hundreds of square kilometers or more.

SUMMARY OF THE INVENTION

We have developed a new approach to LSAS that uses a population of service antennas that is distributed over a geographic region, and not concentrated in a compact, localized array of the kind in which there are strong correlations among the propagation channels to each of the array elements. The distributed service antennas are connected via a backhaul network (which may include one or more wireless links) to a network node serving as a hub. The service antennas each operate semi-autonomously. The population of service antennas and served ATs can operate collectively, without subdivision into individual cells.

Accordingly, our invention in one aspect is a communication method using a distributed cell-free network of spatially independent service antennas. In a broad embodiment, it comprises allocating pilot sequences to a user population of access terminals by an allocation procedure that imposes local relative orthogonality of pilot sequences; and determining one or more channel coefficients for each access terminal of at least an active user subpopulation by measuring allocated pilot sequences as received by each of the service antennas. The determination of channel coefficients is performed independently and the resulting channel coefficients are locally stored at the respective service antennas. At each service antenna, a processor independently uses locally stored channel coefficients to precode forward link signals or to at least partially decode reverse link signals.

In a more specific embodiment, our method further comprises distributing a plurality of messages to the service antennas, wherein each message is destined for a respective access terminal and the same message plurality is delivered to each of the service antennas. The messages are all concurrently transmitted from all of the service antennas. Prior to transmitting the plurality of messages, each service antenna precodes each message with one or more weight factors derived from the channel coefficients, and then sums the precoded messages.

In another more specific embodiment, our method further comprises concurrently receiving a plurality of messages at each of the service antennas, wherein each message is received on a reverse link from a respective one of the access terminals. After receiving the plurality of messages, each service antenna at least partially decodes each respective message of the plurality using one or more weight factors derived from the channel coefficients.

DETAILED DESCRIPTION

Figure 1:
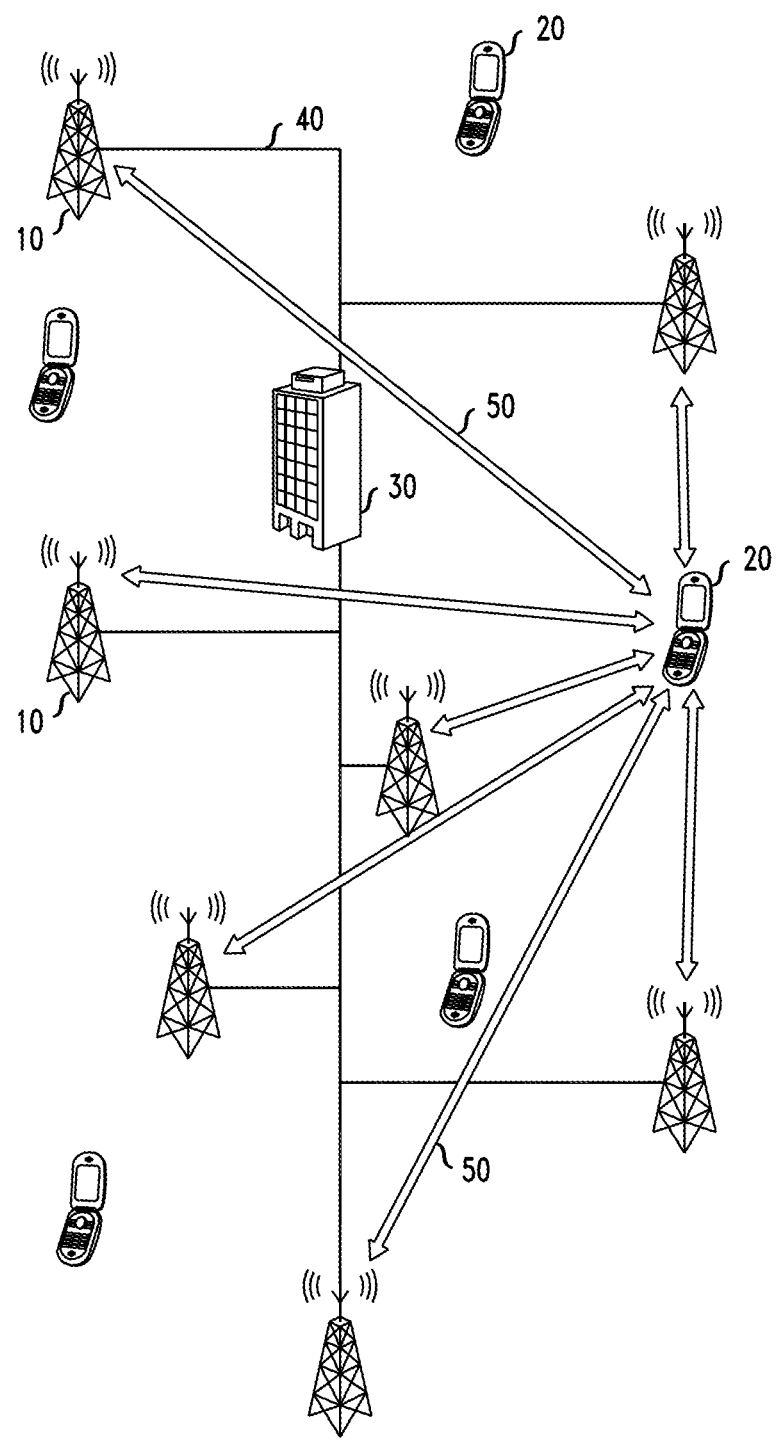
FIGS. 1 and 2 provide a simplified schematic diagram of a network of service antennas and ATs served thereby. Symbolically shown in FIG. 1 are the forward and reverse propagation channels between a selected one of the ATs and the population of service antennas. Symbolically shown in FIG. 2 are the forward and reverse propagation channels between a selected one of the service antennas and the population of ATs.

Turning to FIG. 1, a population of service antennas 10 serves a population of ATs 20. The service antennas are connected to each other, and to a hub node 30, over a backhaul network 40. Although the backhaul network will typically be a fixed, landline network such as a fiber optic network, other implementations are possible and should not be excluded. For example, the backhaul network may be a wireless network. Indeed, in some implementations a designated subpopulation of the ATs may assume the role of the service antennas. Typically, the ATs would have capacity reserved for performing in such a dual role. ATs that can perform such dual roles may be of particular value for ad hoc networks, if such networks are organized according to the principles to be described here.

Although each service antenna is shown, and will be discussed below, as though it comprises a single antenna element, other implementations are possible in which some or all of the service antennas are multi-element arrays. As will be appreciated by those skilled in the art, our mathematical treatment, below, is readily extended to such other implementations.

The service antennas will typically be distributed over a wide area, such as a city. The distribution will typically be random. The total number of service antennas should be at least the number of ATs that are served, and is preferably larger by a factor of two or more, or even by a factor of ten or more. The minimum distance between service antennas is preferably greater than one-fourth the operating wavelength, so as to avoid strong correlations in the channel coefficients of neighboring service antennas. The methods to be described here are performed without reliance on a cellular structure or cellular boundaries, although the service antenna population may have other modes of operation in which it is organized into cells.

The service antennas operate semi-autonomously, as will be explained in detail below. On the forward link, the data streams transmitted by the service antennas and destined for respective ATs are separated using the techniques of spatial division multiplexing (SDM). On the reverse link, the data streams transmitted by the respective ATs are likewise separated using SDM techniques.

As symbolically indicated in FIG. 1 for a selected one of the ATs, each service antenna has a respective propagation channel 50 to each of the ATs that it serves. To simplify the drawing, symbolic representations of the propagation channels between the other service antennas and the rest of the AT population have been omitted.

SDM is made possible because each of the service antennas obtains an estimate of its channel coefficients by measuring pilot sequences that are transmitted on the reverse link by the ATs and received by the service antenna.

Figure 2:
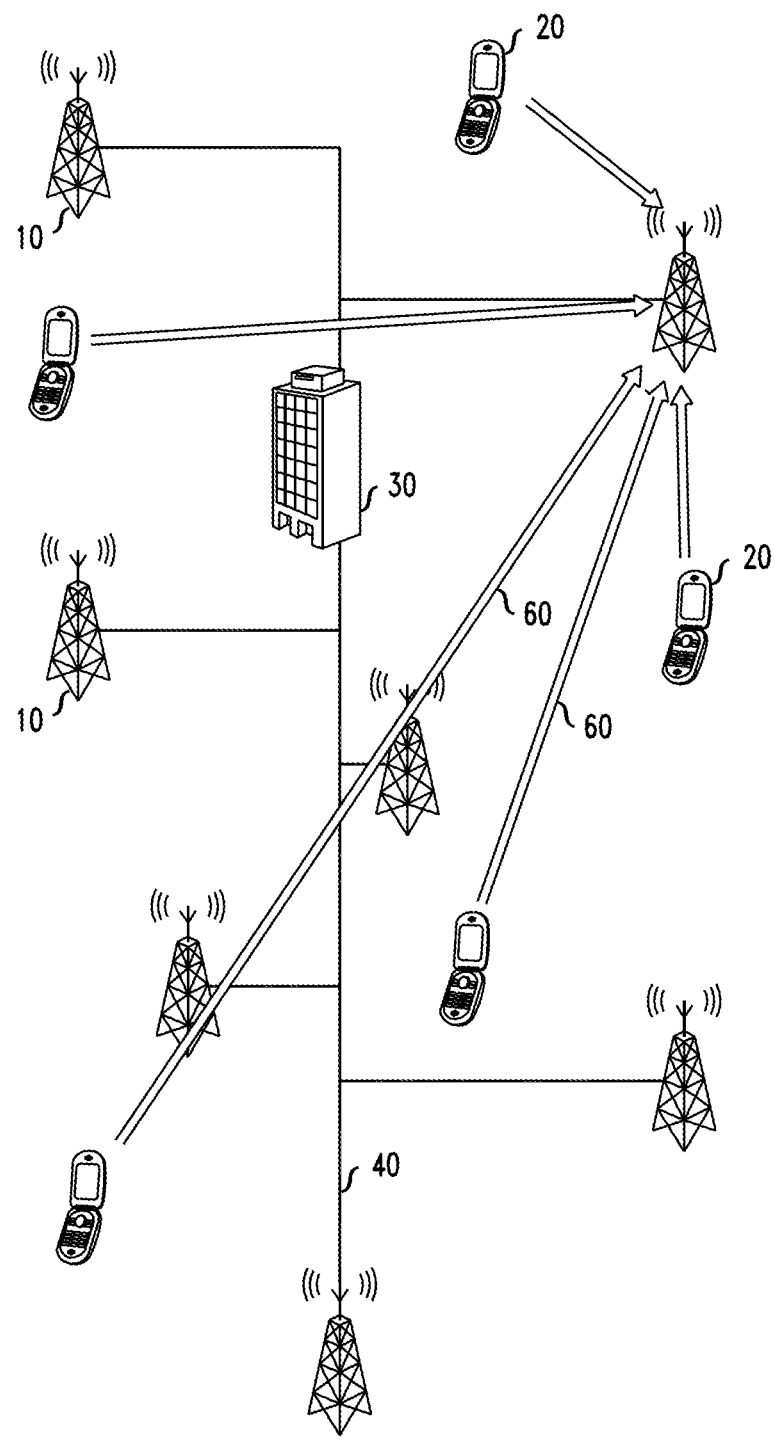

As symbolically indicated in FIG. 2, all of the ATs in at least an active subpopulation concurrently transmit their pilot sequences 60, which are received by at least an active subpopulation of the service antennas. To simplify the drawing, symbolic representations of the pilot transmissions are shown from all of the represented ATs to only one selected service antenna. It will be understood that each of the ATs is at the same time also transmitting to all of the other represented service antennas.

The channel estimates obtained in such a manner are, strictly speaking, reverse link channel estimates. In the exemplary embodiment to be described here, however, time-division duplex (TDD) operation is employed for communication between the service antennas and the ATs. In TDD operation, the forward and reverse channels are separated in time but use the same frequencies. By reciprocity, then, the channel estimates for each forward link may be taken as equal to the estimates for the corresponding reverse link.

As will be discussed in more detail below, any channel estimate will be valid only within a coherence interval. The coherence interval depends on the fading characteristics of the particular network of interest. In typical mobile networks, the coherence interval is approximately the time for a mobile terminal to travel a distance of one-fourth the operating wavelength.

Figure 3:
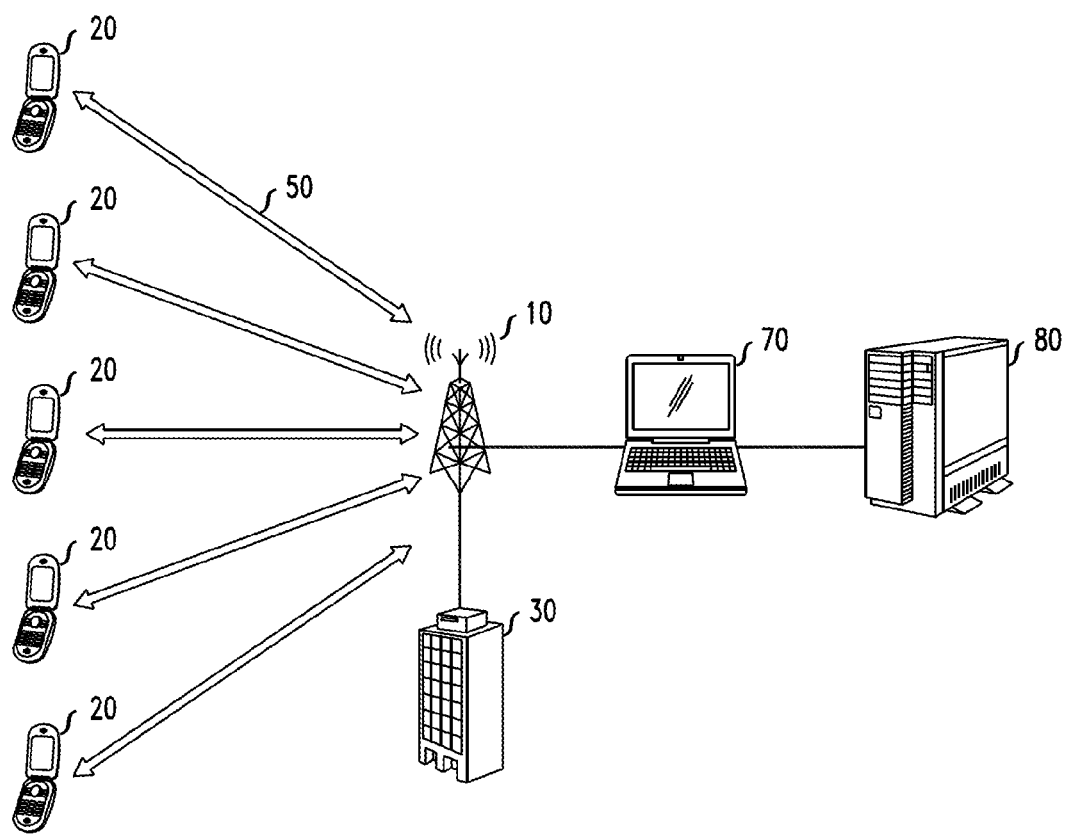
FIG. 3 is a simplified schematic diagram of a selected one of the service antennas of the preceding figures in greater detail. Symbolically shown in the figure are the forward and reverse propagation channels between the service antenna and the population of ATs.

With reference to FIG. 3, each service antenna 10 has a co-located digital processing device 70 and a digital memory device 80 that stores the estimates of the channel coefficients obtained from the pilot signals. The service antennas may take any of various configurations, ranging from full-scale cellular base station antennas and associated hardware to small, self-contained units operating with a low power budget, such as a budget of several milliwatts to several watts.

Often, it will be advantageous to deploy, for the service antennas, a large number of such small units, each including an antenna, radiofrequency electronic circuitry, baseband signal-processing hardware, and an interface to the backhaul network. Such units could be deployed with great freedom and as dictated by, convenience, at such density as is required to achieve a desired level of network performance. More units could be added as needed, without making any basic changes to the system operation.

Although a network as described here can be operated using an explicit power control algorithm, the exemplary implementation described here relies instead on an implicit form of power control for the forward link. That is, each channel coefficient is expressible as a complex number having an amplitude and a phase. Simply stated, the amplitude represents attenuation of the received signal due to propagation over the channel, and the phase represents time delay due to propagation over the channel. (More accurately, these terms generally represent cumulative effects as summed over multiple signal paths.)

The amplitudes of the channel estimates to the respective service antennas will vary as an individual mobile AT moves through the area of coverage. As will be explained in detail below, each service antenna precodes the messages destined for a given AT using a coefficient that is reciprocally related to the pertinent channel estimate. As a consequence, the power expended by a service antenna on a given AT will fall and rise in a natural way as the AT respectively approaches and draws away from the service antenna.

As will be explained below, excessive concentration of transmission power on distant ATs may be avoided by e.g., defining the active subpopulations of service antennas and ATs in each transmission interval in such a way that service antennas and ATs that are far apart will not be mutually active. This may be achieved, for example, by zeroing those precoding coefficients that, because of a weak channel, are less than a specified threshold. As those skilled in the art will appreciate, various alternative methods are available for organizing. AT-service-antenna pairs into mutually active lists, including methods based on the geographical locations of the ATs and service antennas. We refer to such operations as "pruning". More will be said about pruning below.

The number of service antennas that are active at a given time should be at least the number of active ATs in the coverage area, and is preferably significantly greater, as noted above. Several favorable effects are seen when the spatial density i.e., the number per unit area) of service antennas grows large compared with the spatial density of ATs: The spectral efficiency and energy efficiency both rise, and the effects of fast fading are diminished. Moreover, it becomes more attractive to operate with a decentralized architecture in which each service antenna maintains its own channel estimates without sharing them with the rest of the network. That is, with increasing spatial density of service antennas, performance penalties that flow from the decentralized architecture fall off, and the decentralized architecture becomes nearly optimal.

As noted above, supplementary service antennas can readily be added to the network as needed on an ad hoc basis. Likewise, the network is readily placed in a sleep mode during periods of low traffic. In the sleep mode, the effective density of service antennas is reduced by temporarily closing down selected service antennas.

We will now describe an exemplary embodiment that operates in TDD and uses Orthogonal Frequency Division Multiplexing (OFDM) as the digital multicarrier modulation method. All active service antennas communicate synchronously with all of the active ATs in the coverage area. (When we say that a population of entities communicates synchronously, we mean that all of the entities are transmitting at the same time, so that the transmission is collective over the population and the transmissions from the individual entities are concurrent in time.) Methods of time-division multiplexing may be used to define different active subpopulations of ATs during different time intervals. By "active AT" is meant an AT that is demanding service, and that is actively obtaining service by transmitting a reverse-link pilot signal, transmitting reverse-link data, and receiving forward-link data.

Accordingly, an active subpopulation of ATs or service antennas may consist of the entire population, or less than the entire population.

A given active subpopulation of ATs is served in one or more consecutive slots, as will be explained below. While the slot-based service activities for the active ATs are taking place, a scheduler implemented, e.g., in a digital processor at the hub is selecting the active subpopulation of ATs for the next slot. In making such selection, the scheduler may apply any of various criteria, including: Whether the ATs have similar mobility characteristics, whether the selection will produce a uniform spatial distribution of active ATs, and whether the level of service requested by the ATs fits a desired profile. The same scheduling interval is also used to assign a pilot sequence to each AT selected for service in the next slot. Those skilled in the art will recognize that in other implementations, the scheduler looks ahead two, three, or more slots, instead of a single slot of the present example.

The length of a slot should be less than one coherence interval. By way of example, assuming an operating wavelength of 1 GHz and mobile ATs moving at normal vehicular highway speeds, the time for a mobile AT to move one-fourth wavelength is about 2.6 ms.

Figure 4A:
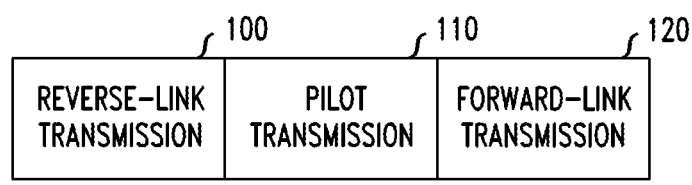
FIGS. 4A and 4B are schematic representations of alternative slot formats according to implementations of our method.

Within the duration of one slot, three distinct actions take place to serve the active ATs, as shown in the slot format of FIG. 4A. First, all of the active ATs synchronously transmit message-bearing signals on the reverse link (block 100). Next, all of the active ATs synchronously transmit pilot sequences, on the reverse link to inform the service antennas of the channels (block 110). Last, all of the active service antennas synchronously transmit message-bearing signals to the ATs on the forward link (block 120). The forward-link signals are precoded using the CSI known to the service antennas. It will be understood that "synchronous" transmission allows for small relative time shifts, given the known tolerances in, e.g., OFDM transmission.

Each of the above three phases will be discussed in turn. Because it will facilitate discussion of the other two phases, we will begin with a discussion of the second phase, i.e., transmission of the pilot sequences.

The objective of the second phase is to provide each service antenna with an estimate of the channel coefficient to each AT. Because the channel coefficients are frequency dependent, the pilot sequences must be designed so that the channel coefficients can be determined as functions of frequency.

Accordingly, a complex-valued channel coefficient $g_{mkn}$ is defined between service antenna m and AT k on OFDM tone n. It will often be advantageous to factor the channel coefficient into a fast-fading coefficient $h_{mkn}$ and a slow-fading coefficient $\beta_{mk}^{1/2}$, i.e., $$g_{mkn} = h_{mkn} \cdot \beta_{mk}^{1/2}. \tag{1}$$

The fast-fading coefficient might change significantly over as little as a fraction of a wavelength, whereas the slow-fading coefficient, which arises from a combination of geometric attenuation and shadow-fading, will typically change only over much longer intervals of space.

The slow fading is typically independent of frequency, whereas the fast fading is frequency-dependent. Even so, however, the fast fading will typically vary only slowly over OFDM tone-index. For example, OFDM transmissions according to the LTE standard employ symbol intervals of 71.4 microseconds, of which guard intervals take up 4.76 microseconds. The guard interval may be taken as an estimate of typical delay spread, and its reciprocal, 210 kHz, may be taken as the corresponding Nyquist interval for describing the dynamics of fading. In LTE, the standard OFDM tone spacing is 15 kHz. Therefore, the Nyquist interval for fading dynamics spans fourteen tones.

We assume for purposes of the present example that the service antennas have no prior knowledge of the fast-fading coefficients, except for such knowledge as may be inferred when ATs are served by consecutive slots and continuity of the propagation channels from one slot to the next can be assumed. On the other hand, it may be feasible for the service antennas to acquire advanced knowledge of the slow-fading coefficients, because those coefficients can be estimated over substantial intervals of time and are independent of frequency. Some algorithms may nominally require knowledge of the slow-fading coefficients. Indeed, rough estimates of the slow-fading coefficients may be based solely on the distance between the service antenna and the pertinent AT, as determined, e.g., via GPS.

As noted above, the service antenna population may be pruned so as to define service antenna and AT subpopulations that are mutually active. In one possible approach, the pruning is based on the slow-fading coefficients as (reciprocally) representing effective distances between the service antennas and the ATs.

Figure 4B:
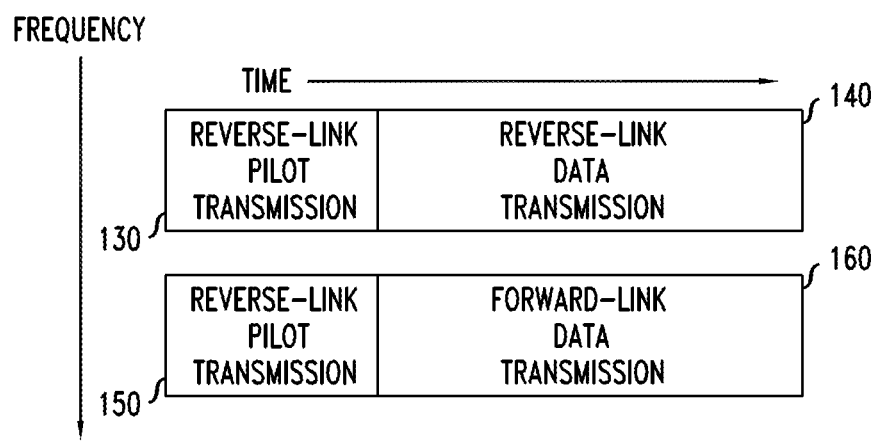

It should be understood that the slot format of FIG. 4A is meant to be exemplary and not limiting. For example, an alternative slot format is provided by FIG. 4B. As seen in the figure, the slot format spans one coherence interval in time, and occupies two frequency subchannels. In one frequency subchannel, a reverse-link pilot transmission 130 occupies an initial portion of the slot, and a reverse-link data transmission 140 occupies the rest of the slot. In the other frequency subchannel, a reverse-link pilot transmission 150 occupies an initial portion of the slot, and a forward-link data transmission 160 occupies the rest of the slot. Other slot formats are possible and will be apparent to those skilled in the art in view of the present discussion.

Figure 5:
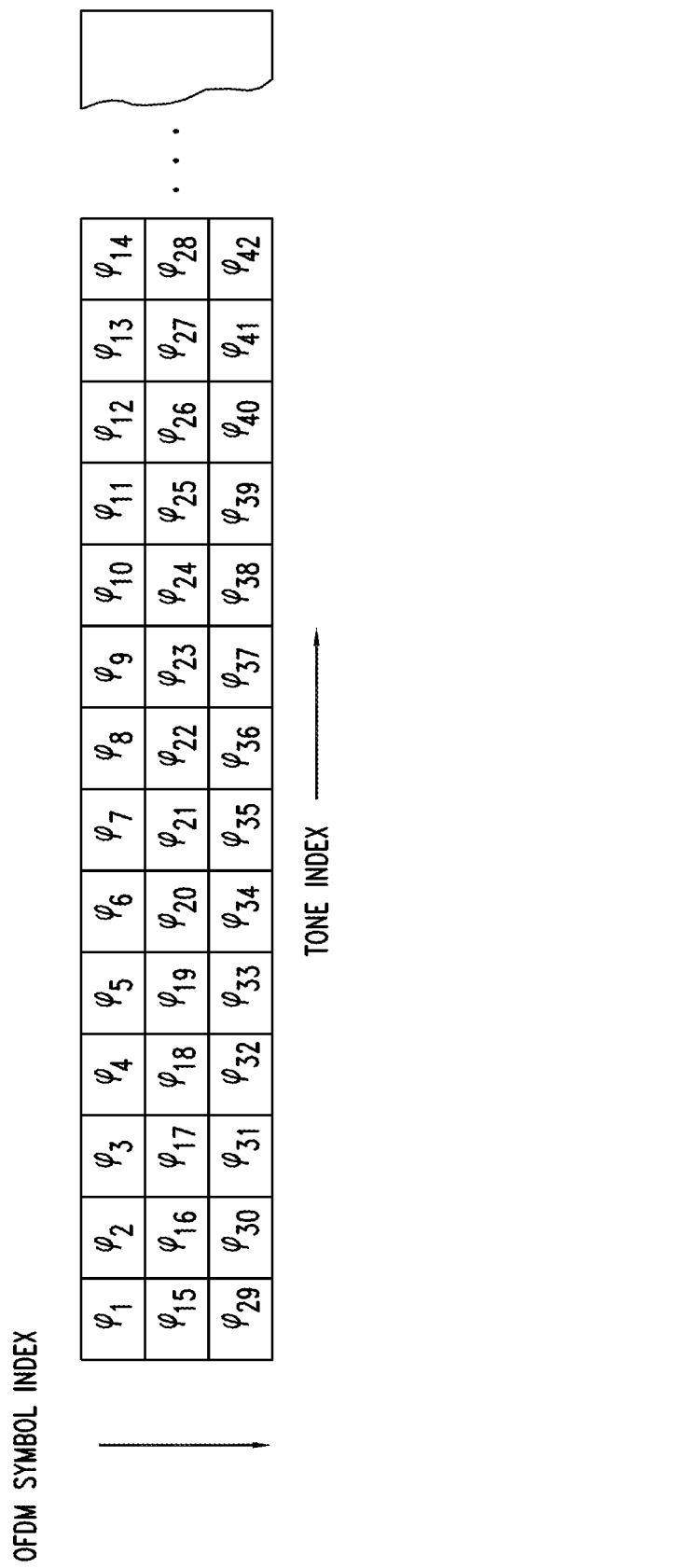
FIG. 5 is a schematic representation of a pilot sequence according to an implementation of our method.

FIG. 5 provides one possible example of a pilot sequence. It will be seen that each row of FIG. 5 represents one OFDM symbol, that the OFDM symbol index increases from the top to the bottom of the figure, and that the pilot sequence shown in the figure spans three OFDM symbols. It will also be seen that each column of the figure represents a distinct tone, and that the tone index increases from left to right, ranging from 1 to 14. Accordingly, each pilot sequence of the kind illustrated is a complex-valued function of tone index and OFDM symbol index, and has a total of 3×14=42 entries.

Each AT is assigned a pilot sequence (or, if possessing multiple antennas, one pilot sequence for each antenna) by the scheduler or another network entity situated at the hub or at another central network node. The pilot sequences are also known to the service antennas as a result, e.g., of distribution to the service antennas over the backhaul from the hub.

The ATs transmit the pilot sequences synchronously. Each service antenna estimates the channel between itself and the ATs by correlating the respective pilot sequences, as known and locally stored, with the pilot signals as received from the ATs. As known in the art, the correlation may include optional multiplication by a constant that is independent of the measurements but depends on the statistics of the measurements. For example, an MMSE linear estimator would typically include a multiplicative factor equal to the correlation between the Channel coefficient and the measurement, divided by the variance of the measurement.

Typically, it will be valid to assume that the channels are substantially constant over the Nyquist frequency interval. As noted above, the Nyquist frequency interval may span a sequential series of tones, such as the fourteen tones mentioned above in connection with the example of OFDM according to the LTE standard. We refer to such a sequential series of tones herein as a "subband". For the reasons discussed above, our exemplary embodiment treats the channel coefficients as piecewise constant over each of a multiplicity of individual subbands.

In typical OFDM implementations, the total spectrum available for use is much wider than a single subband, and in fact can be spanned by a multiplicity of subbands. To make maximum use of the available spectrum, it is advantageous to employ pilot sequences that are reused (typically with modifications as explained below) in each of the multiplicity of subbands.

If identical sequences are repeated periodically in the frequency domain, they may produce distracting concentrations of energy in the time domain. Therefore, viewing the pilot sequence as a vector, it is most desirable to vary it from one subband to the next by, e.g., multiplying it with a predetermined unitary matrix. Alternatively, a unique pilot sequence could be designed for each sub-band, or pilot sequences, with or without modification, could be swapped among the various ATs from one subband to the next.

According to any such scheme, a separate time-frequency correlation (wherein time corresponds to the indices of the OFDM symbols and frequency corresponds to the tone indices within the sub-band) is performed within each sub-band, to obtain an estimate of the frequency response within the subband.

We will now present a discussion of how channel estimation may be performed using the pilot sequences, for subsequent use in precoding and decoding. Each pilot sequence will be treated as a $\tau_r \times 1$ vector $\varphi_l$, in which the number $\tau_r$ is the length of the pilot sequence in symbols, times the number of tones (in one subband instance of the pilot sequence). With reference to FIG. 5, the vector $\varphi_l$ may be thought of as the concatenation, in sequence, of each of the rows of the figure.

Accordingly, we suppose that K access terminals (ATs) are served by the pilot sequences $\{\varphi_1, \ldots, \varphi_K\}$, wherein each of the $\varphi_l$ is a $\tau_r \times 1$ vector constructed such that $\varphi_l^H \varphi_l = 1$, the superscript "H" denoting "conjugate-transpose". The m-th service antenna receives a pilot signal from each of the K ATs. The total received signal, summed over all K ATs, is a $\tau_r \times 1$ vector given (after suppressing the tone-index) by $$y_m = \sqrt{\tau_r p_r} \sum_{\ell=1}^{K} g_{m\ell} \varphi_\ell + v_m, \quad (2)$$

where $p_r$ is the power expended in transmission, per symbol, by each terminal and $v_m$ is the $\tau_r \times 1$ vector of additive noise, whose components are assumed without loss of generality to have variance of one. The normalization adopted in Equation (2) is conventional.

The tone index does not explicitly appear in Equation (2) because the channel coefficients $g_{ml}$ are assumed constant over all tones in the subband of interest, and in our representation the individual entries of each vector $\varphi_l$ range, as noted, over a compound time-frequency dimension.

Well-known MMSE techniques are advantageously used, according to which the minimum mean-square linear estimator $\hat{g}_{mk}$ for the propagation coefficient, $g_{mk}$, is $$\hat{g}_{mk} = \frac{\sqrt{\tau_r p_r} \beta_{mk}}{1 + \sum_{\ell=1}^{K} \tau_r p_r \beta_{mk} |\varphi_k^H \cdot \varphi_\ell|^2} \cdot (\varphi_k^H \cdot y_m). \quad (3)$$

In Equation (3), it will be seen that the statistic $(\varphi_k^H y_m)$ is weighted by a fractional expression in which the numerator expresses the correlation between the channel coefficient and the aforesaid statistic, and the denominator expresses the variance of the same statistic. As will be seen, the statistic $(\varphi_k^H y_m)$ is "sufficient" in the sense that it can be used for the processing of signals without loss of information.

It will be evident from Equation (3) that the channel estimation can be performed in a de-centralized fashion by each service antenna individually.

Ideally, all of the pilot sequences would be mutually orthogonal. This will not be achievable in practice for most systems, however, because the number of active ATs will generally be greater than the number of pilot sequences that can be made mutually orthogonal. The upper bound on the number of mutually orthogonal pilot sequences is the product of the Nyquist interval (measured in number of tones) times the symbol-duration of the pilot sequences. In the example of LTE OFDM cited above, the Nyquist interval is fourteen tones and the pilot sequence occupies three OFDM symbols, so that there cannot be more than 42 mutually orthogonal pilot sequences.

Hence, it will usually be the case that some, or even most, pilot sequences will be correlated with other pilot sequences. One consequence is pilot contamination, in which a service antenna's estimate for a channel to a particular AT is contaminated by the channels to other ATs. This can lead to interference on both the forward link and the reverse link, which may persist even in the theoretical limit of an infinite number of service antennas.

Our solution is to allocate the pilot sequences to ATs by a procedure that imposes local relative orthogonality of pilot sequences. By "relative orthogonality", we mean that there is a scale of orthogonality between a pair of pilot sequences that varies from zero orthogonality to total orthogonality, and that according to such scale, different pairs of pilot sequences may have different levels of orthogonality. By "local relative orthogonality", we mean that if a nearest neighbor group of ATs, a next-nearest neighbor group, and so forth for greater degrees of separation are defined for a given AT, then on average the pilot sequence assigned to the given AT will be most orthogonal to those assigned to the nearest neighbors, and progressively less orthogonal to those assigned to the neighbor groups of increasing degrees of separation.

By way of illustration, one distance measure that may be used to provide an orthogonality scale is given by the expression $$\text{Orthogonality} = 1 - \frac{|\varphi^H \psi|^2}{\|\varphi\|^2 \cdot \|\psi\|^2},$$

which has the nature of a sine-squared function of an angular separation between the respective pilot sequences $\varphi$ and $\psi$, and which will equal 1 when $\varphi$ and $\psi$ are completely orthogonal, and will equal 0 when they are identical (to within a multiplicative constant).

We will now describe two possible methods for assigning pilot sequences to the ATs with local relative orthogonality. The first method is a greedy algorithm that sequentially assigns the pilot sequences in a random order, such that each new pilot is chosen for maximum benefit of the new AT. The second method is an algorithm in which pilot sequences are assigned as a function of the spatial position of the AT. The goal for either algorithm is to ensure that those ATs which are prone to harming each other through pilot contamination will have nearly orthogonal pilot sequences.

Greedy Pilot Assignment

The ATs are assigned pilots in a random order. Suppose k−1 pilots have already been assigned. The k-th pilot is now assigned for the maximum benefit of the k-th access terminal, irrespective of the effect of the choice on the older access terminals.

We denote the previously-assigned pilot sequences by the column vectors, $\{\varphi_1, \ldots, \varphi_{k-1}\}$. The pilot sequence for the k-th access terminal is $\varphi_k$, and, recalling Equation (3), the sufficient statistic is $\varphi_k^H \cdot y_m$, the variance of which is $$E\{|\varphi_k^H \cdot y_m|^2\} = 1 + \tau_r p_r \beta_{mk} + \sum_{\ell=1}^{k-1} \beta_{m\ell} |\varphi_k^H \cdot \varphi_\ell|^2. \quad (4)$$

The third term on the right-hand side of Equation (4) is a measure of the pilot contamination at service antenna m with respect to the k-th access terminal.

One criterion (among many possible alternatives) for choosing the k-th pilot sequence would be to minimize the pilot contamination as summed over all service antennas. Letting M represent the total number of service antennas, such a criterion would be applied by solving the problem $$\min_{\varphi_k} \left\{ \sum_{m=1}^{M} \sum_{\ell=1}^{k-1} \beta_{m\ell} |\varphi_k^H \cdot \varphi_\ell|^2 \right\}. \quad (5)$$

Those skilled in the art will recognize that the problem of Equation (5) belongs, equivalently, to the well-known class of problems of finding an eigenvector having minimum eigenvalue. There are standard methods for solving such problems, as those skilled in the art will appreciate. More generally, the problem could be approached by minimizing a weighted sum of pilot contamination terms. In such an approach, the weights are chosen subject to a criterion of goodness with respect to beamforming. The procedure represented by Equation (5) may be performed, for example, at the hub, aided by an auxiliary communication link between the hub and the service antennas.

As explained above, a pilot sequence is transmitted in each subband. To avoid frequency periodicity, the pilot sequence vectors may, as noted, be modified between subbands by multiplication with a unitary matrix. Alternatively, the greedy algorithm may be applied to design a unique pilot sequence for each sub-band, using a distinct, random ordering of the ATs for each application of the algorithm. This would have the advantage that a bad choice of pilots would not be repeated in every sub-band.

Spatial Pilot Assignment

With this method, the pilot sequences are spatially assigned according to a random-field generating mechanism.

The available pilot sequences at any geographical position of an AT, denoted in Cartesian coordinates by (x, y), constitute the column vectors of a $\tau_r \times \tau_r$ unitary matrix:

$$\Phi(x,y) = [\varphi_1(x,y) \varphi_2(x,y) \ldots \varphi_{\tau_r}(x,y)], \quad (6)$$

wherein $$\Phi^H(x,y)\Phi(x,y) = I_{\tau_r}. \quad (7)$$

Accordingly, a random field is defined over two-dimensional geographical space. The random field value at each point is a unitary matrix $\Phi(x, y)$ as defined above.

It would be possible, by computation in, e.g., a digital processor, to generate a unitary pilot-matrix field that is uncorrelated over space. However, it would be preferable to introduce a controlled amount of spatial correlation, so that ATs disposed in near proximity (which are prone to the greatest mutual interference) will have substantially the same unitary matrix, and hence substantially the same $\tau_r$ pilot sequences, available to them. Because the columns of a unitary matrix are all mutually orthogonal, that would make it possible to assign nearly orthogonal sequences to the near-neighbor ATs.

In general, it will be advantageous if the spatial correlation of the pilot-matrix field decreases as the density of ATs increases.

One way to generate the unitary field is first to generate a $\tau_r \times \tau_r$ complex Gaussian random field, Z(x, y), whose scalar elements are independent identically-distributed zero-mean circularly-symmetric complex Gaussian spatially correlated random fields. The scalar Gaussian random fields (i.e. the elements of the matrices that are constructed) could be generated, using standard techniques, so as to have a specified spatial correlation. Well-known techniques useful for such purpose include those that use stochastic difference or differential equations, or in the spatial frequency domain, those that use spectral methods.

The unitary matrix-field is obtained from the Gaussian matrix field by the well-known Q-R factorization, Z(x, y)=$\Phi$(x, y)R(x, y), in which R(x, y), is lower-triangular.

In an alternative approach, the unitary random field is generated directly via a pair of coupled stochastic partial differential equations. That is, by taking the partial derivatives of both sides of Equation (7), we obtain $$\frac{\partial}{\partial x}\Phi(x, y) = \Phi(x, y)\Omega_1(x, y), \quad (8)$$

$$\frac{\partial}{\partial y}\Phi(x, y) = \Phi(x, y)\Omega_2(x, y),$$

wherein the random fields $\Omega_1(x, y)$ and $\Omega_2(x, y)$ are $\tau_r \times \tau_r$ complex skew-symmetric "angular velocity" matrices, $\Omega_1(x, y) = -\Omega_1^H(x, y)$, and $\Omega_2(x, y) = -\Omega_2^H(x, y)$.

The partial differential equations of Equation (8), when combined with an appropriate initial condition $\Phi(x_0, y_0)$, will completely specify the unitary random field for all $(x, y) \geq (x_0, y_0)$. By making the initial condition isotropically random, it can be assured that all $\Phi(x, y)$ will be marginally isotropically random. Thus, for example, the real and imaginary components of the angular velocity matrices could be specified as independent identically-distributed spatially-uncorrelated Gaussian random fields. The overall magnitude of the spatially-white components would control the spatial correlation of the unitary field. The spatial correlation could be adapted to a changing spatial density of ATs through the use of a scale factor applied to the components of the angular velocity matrices. The scale factor would be varied locally to locally adjust the correlation distance.

In order to specify the available pilots at each point in space, a rule is needed that directs which one of the $\tau_r$ pilots is to be assigned to a given AT. When ATs are sufficiently far apart such that the unitary field is uncorrelated, the choice is somewhat arbitrary. However, for ATs that are situated near each other, and where the unitary field is significantly correlated, pilot sequences should be as nearly orthogonal as possible.

We will now describe one possible approach for determining which pilot sequence is to be assigned to a given AT. This approach may be performed without communication between the ATs and the hub:

The two-dimensional geographical space is partitioned into a plurality of non-overlapping areas having respective geographical center points $(x_1, y_1)$, $(x_2, y_2)$, etc. The collection consisting of all of the areas is partitioned into clusters. Each cluster consists of $\tau_r$ areas that lie near each other, where $\tau_r$ is the length of a pilot sequence. The areas within each cluster are ordered from 1 to $\tau_r$.

A set of unitary matrices $\Phi(x_1, y_1)$, $\Phi(x_2, y_2)$, etc., is generated in one-to-one correspondence with the respective area center points. Within each cluster, the j'th area $(j=1, \ldots, \tau_r)$ takes for its designated pilot sequence the th column of its own corresponding unitary matrix. Because (1) it is expected that all unitary matrices assigned to a given cluster will be highly correlated with each other, and (2) each column of a given unitary matrix will be completely orthogonal to every other column of the same matrix, this method will provide, with high probability, strong relative orthogonality among the pilot sequences assigned within each given cluster.

Each new AT identifies its geographical location (x, y) and the corresponding area, and adopts the pilot sequence assigned to that area. If two or more ATs are concurrently located within the same area, the hub can serve them both by using a time-sharing technique.

We will now describe an alternative approach for pilot assignment. This approach involves communication between the ATs and the hub:

Each new AT identifies its geographical location (x, y) and computes the unitary matrix $\Phi(x, y)$ or, alternatively, communicates its location to the hub and obtains $\Phi(x, y)$ from the hub. The hub selects a column of the unitary matrix for assignment to the AT as its pilot sequence.

To select a matrix column for assignment, the hub may, for example, use the following greedy approach:

(1) Initialize n=1.

(2) Relative to the new AT, identify a sequence of neighbor ATs, consisting of the nearest AT, the next-nearest AT, etc.

(3) Identify the pilot sequence $\varphi_I$ used by the nearest-neighbor AT.

(4) Select those columns $u_j$ of $\Phi(x, y)$ that satisfy the following test relative to a threshold t:

$$\frac{1}{\|\varphi_1\|^2} \cdot |\varphi_1^H \cdot u_j|^2 \leq t.$$

One possible choice of threshold is $t=1/\tau$, where $\tau$ is the length of pilot sequence. With such a choice of threshold, it can be guaranteed that at least one column of $\Phi(x, y)$ will satisfy the test. A pilot sequence $u_j$ that satisfies the threshold test is, equivalently, a pilot sequence that has sufficient angular separation from $\varphi_I$.

(5) Define the set $\Omega_1$ as the set whose elements are the selected columns.

(6) Increment n; i.e., replace n by n+1.

(7) Identify the pilot sequence $\varphi_n$ used by the next AT in the neighbor sequence.

(8) Select those columns of $\Omega_{n-1}$ that are sufficiently orthogonal to $\varphi_n$ according to the threshold test.

(9) Define the set $\Omega_n$ as the set whose elements are the selected columns.

(10) Repeat Steps 6-9 until the set $\Omega_n$ is empty.

(11) Assign any column of $\Omega_{n-1}$ as the pilot sequence for the new AT.

We turn now to the first phase of the slot as represented, e.g., by block 100 of FIG. 4A, where reverse-link transmission takes place. In block 100, the K ATs synchronously transmit message-bearing symbols, e.g. QAM symbols, $\{q_{r1}, \ldots, q_{rK}\}$ on the reverse link. (The subscript "r" indicates that the reverse link is being used for transmission.) The term "QAM symbol" should be understood broadly as including, among other things, PSK symbols. The m-th service antenna receives the following combined signal from K ATs, $$x_{rm} = \sqrt{p_r} \sum_{\ell=1}^{K} g_{m\ell} q_{r\ell} + w_{rm}, m = 1, \ldots, M, \quad (9)$$

wherein the $\{w_{rm}\}$ constitute additive receiver noise. If desired, any of various well-known power-control algorithms could be used by the ATs to variably control their transmit power.

In Equation (9), the subscript associated with the OFDM tone index has been suppressed in the quantities $q_{r\ell}$, $x_{rm}$, and $w_{rm}$. In other words, each of these quantities should be understood as a complex-valued vector over the tone indices. It will be recalled, however, that in our example, the coefficients $g_{m\ell}$ are constant for all tone indices within a given subband. Extension to the more general case in which $g_{m\ell}$ varies from tone to tone within a subband is straightforward. For clarity, it is also noted here that for each tone index, the product $g_{m\ell}q_{r\ell}$ in Equation (9) is formed by ordinary scalar multiplication. Similar comments apply to the equations that follow below.

A matched-filter receiver, as is well-known in the art, would process the received signals to obtain an estimate $\hat{q}_{rk}$ of the QAM symbol transmitted by each AT k as follows, $$\hat{q}_{rk} \propto \sum_{m=1}^{M} \hat{g}_{mk}^{*} x_{rm}, k = 1, \ldots, K, \quad (10)$$

where the superscript "*" denotes "complex-conjugate". The quantities $\hat{q}_{rk}$ and $x_{rm}$ are vectors over the tone indices in the same sense as the quantities discussed above in regard to Equation (9). The symbol "∝" means "is proportional to".

More generally a weighted sum could be employed, $$\hat{q}_{rk} \propto \sum_{m=1}^{M} a_{rmk} \hat{g}_{mk}^{*} x_{rm}, k = 1, \ldots, K, \quad (11)$$

in which a set of weights $\{a_{rmk}\}$ are chosen to optimize an appropriate performance criterion, such as a lower bound on capacity.

One advantage that is gained by implementing the receiver as a matched filter is that the receiver function can be distributed. In a distributed implementation, each service antenna m performs its own multiplications $a_{rmk} \hat{g}_{mk} x_{rm}$, $k=1, \ldots, K$, utilizing its own channel estimates $g_{mk}$, i.e., the set of channel estimates made by the given service antenna between itself and the AT population. As a result of its performing such a multiplication for each AT k, each service antenna m can provide, for each AT k, a respective m'th one of the terms in the summation of Equation (11).

There are several possible ways to perform, for each AT, the summation of Equation (11). In one approach, the service antennas send the terms which are to be summed to a central unit such as hub 30 of FIGS. 1 and 2 over the backhaul network, and the central unit performs the summation.

In some implementations, the pruning operation that defines mutually active subpopulations may be carried out in a distributed manner by the service antennas acting independently. In some such cases, it may be advantageous for each service antenna to inform the hub of those ATs with which it is (or is not) mutually active, so that the hub can acquire a list of those summations (each pertaining to a respective AT) to which each service antenna is making a contribution. However, this will not always be essential, because even a truncated sum (with zeroes accumulated for non-contributing service antennas) will often provide a sufficient signal-to-noise-and-interference ratio for signal recovery.

In another approach, the service antennas cooperatively perform the summation in a daisy-chain manner. In that approach, an ordered path through the entire service antenna population is defined. The first service antenna provides its term of the summation to the second service antenna. As received at the second service antenna, this term is the first of a sequence of partial sums. The second and each subsequent service antenna adds its term to the received partial sum and passes the result on to the next service antenna as the next partial sum. The last service antenna adds its respective term to complete the summation, and then it passes the result to the hub or other central unit as the first-stage decoded signal.

In a second decoding stage, a central unit, e.g. the hub, which receives the first-stage decoded signals can perform soft error-correction decoding on them even if it knows nothing about the individual service antennas, and even if it doesn't know how many service antennas there are. However, to perform the soft error-correction decoding, the central unit would need to know the expected overall processed gain for each AT, and it would need to know as well as the effective noise variance for each AT. These quantities may be derived either from calculations based on the known slow-fading coefficients, or they may be obtained from additional pilot signals embedded in the reverse-link data transmission.

If MMSE channel estimates are employed in the matched-filter, then the decoded symbol will be dominated by contributions from service antennas to which the terminal enjoys a combination of a strong channel and low pilot contamination. Accordingly, the summations of Equations (10) and/or (11) may, if desired, be artificially limited to include only the most favorable service antennas for the pertinent AT k. This is expected to result in little degradation in performance, and offers the advantage that both the back-haul traffic and the typical computational burden will be reduced.

We will now turn to the third phase of the slot, corresponding to block 120 of FIG. 4A, in which the service antennas transmit QAM symbols synchronously to the ATs using linear precoding. The m-th service antenna transmits the following pre-coded signal (as above, the ODFM tone index is suppressed):

$$s_m = \sum_{k=1}^{K} a_{fmk} \hat{g}_{mk}^{*} q_{fk}, m = 1, \ldots, M, \quad (12)$$

where the $\{a_{fmk}\}$ are weights, chosen subject to an optimality criterion and to satisfy power constraints. The quantities $a_{fmk}$ and $\hat{g}_{mk}$ are indexed over tones, but in the example presented here they are piecewise constant over the subbands. Extension to the more general case in which these quantities vary with tone index within each subband is straightforward.

Each service antenna independently performs the operation of Equation (12) utilizing its own channel estimates, although there may be optional cooperation among the service antennas in choosing the weights $\{a_{fmk}\}$.

To perform soft error-correction decoding of their received signals, the ATs need to know the effective gain of the combined forward link from the service antennas as well as the effective noise variance from the service antennas, which can be obtained either from calculation based on known statistics, or from auxiliary pilots embedded in the forward QAM symbols.

As explained above in regard to the reverse-link data transmission, many of the service antennas will contribute negligibly to certain ATs, hence the range of the summation in Equation (12) may be artificially curtailed without significant reduction in performance, and with the benefit of reducing both the backhaul traffic and the typical computational burden.

Time-Domain Implementation

The preceding discussion assumed an OFDM implementation, which was meant to be exemplary and not limiting. For example, the broad principles elaborated above may also be applied in a time-domain implementation.

In one possible implementation, the pilot sequences comprise sequences of complex-valued temporal impulses spaced by the channel delay-spread. The respective complex values of the impulses may be chosen so that each pilot sequence is orthogonal to other pilot sequences. Typically, the sequences would be too short to offer complete mutual orthogonality, and thus a scheme for achieving local relative orthogonality would advantageously be imposed.

Methods of channel estimation from temporal pilot signals are well known and need not be described here in detail.

Those skilled in the art will understand that the weightings used in the matched filtering operation of Equation (10) and in the pre-coding operation of Equation (12) are equivalent in the time-domain to convolving respectively the received signal or the QAM sequence with the time-reversed and conjugated channel impulse response estimate. It is advantageous that these time-domain operations are of sufficient mathematical simplicity to allow for analog implementation, which may provide savings in electrical power consumption relative to the digital OFDM implementation.

System Operation—Exemplary Scenario

Figure 6:
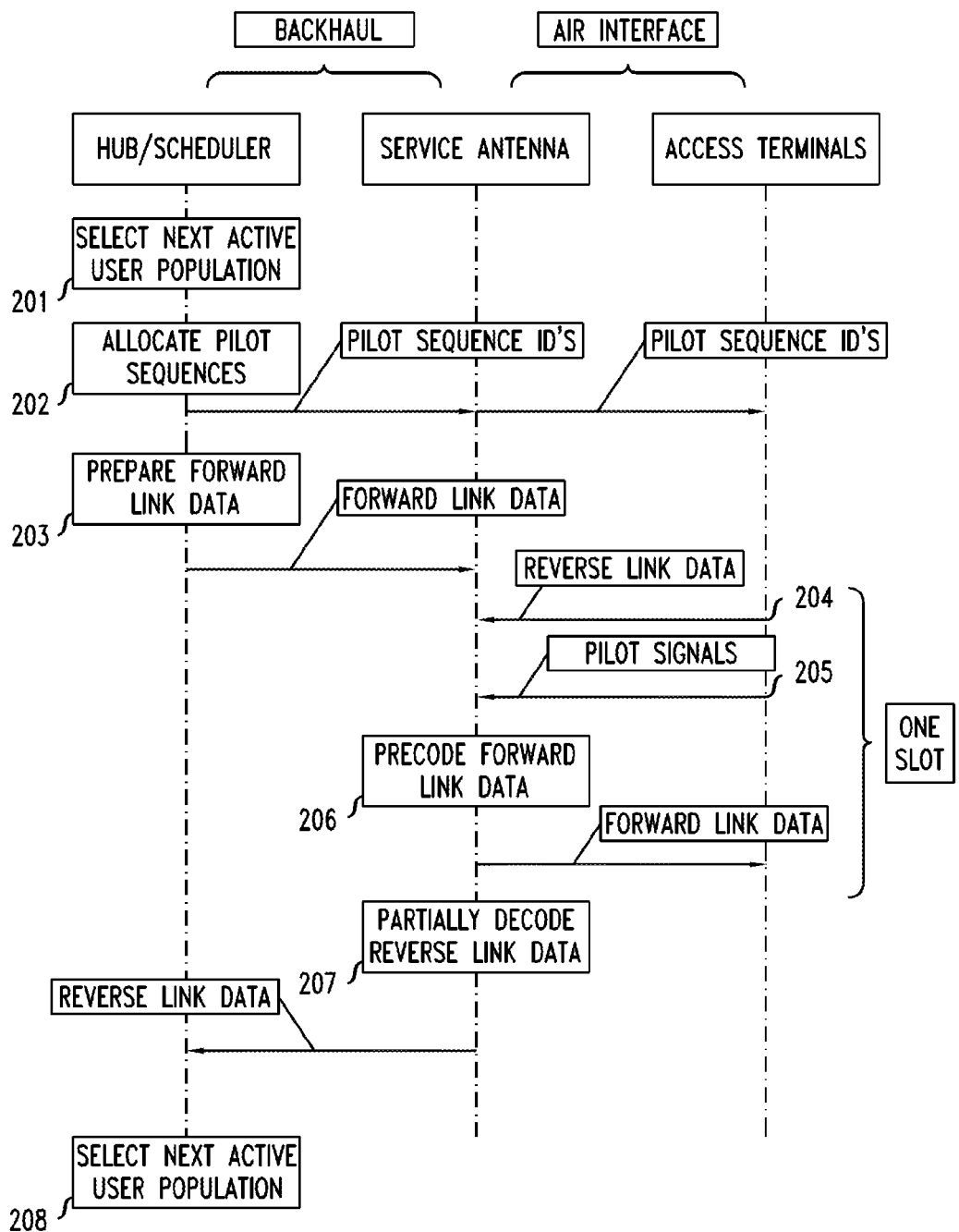
FIG. 6 is a timing diagram illustrating a sequence of processing and transmission steps according to an implementation of our method.

FIG. 6 provides an overview of the operations described above, in an exemplary embodiment. At 201, a scheduler implemented at the hub node selects the next active user population. At 202, the scheduler allocates the pilot sequences and forwards identifying indices of the sequences to the service antennas over the backhaul. The service antennas transmit the indices to the ATs. At 203, the forward link data are prepared at the hub and forwarded to the service antennas over the backhaul.

At 204, the ATs transmit reverse link data to the service antennas. At 205, the ATs transmit their pilot signals to the service antennas. At 206, the service antennas precode forward link data using channel measurements that they have obtained from the pilot signals, and they transmit the precoded forward link data to the ATs. Steps 204, 205, and 206 comprise the operations that make up one slot format, as discussed above in connection with FIG. 4A.

At 207, the service antennas partially decode the reverse link data and forward the partially decoded data to the hub for summation and signal recovery.

At 208, a new cycle begins with selection, by the scheduler, of a new active user population.

We claim:

1. A communication method using a distributed cell-free network of service antennas, comprising:
    allocating pilot sequences to a user population of access terminals by an allocation procedure that imposes local relative orthogonality of pilot sequences, wherein the allocating comprises:
    generating a plurality of unitary matrices each associated with non-overlapping areas of a two-dimensional geographical space using a random field generating mechanism that imposes a controlled amount of spatial correlation for access terminals disposed in near proximity to each other,
    designating a row or column of each particular unitary matrix to a respective non-overlapping area that the particular unitary matrix is associated with, and
    allocating, to each particular access terminal, the row or column designated to a non-overlapping area where the particular access terminal is located;
    determining one or more channel coefficients for each said access terminal by measuring allocated pilot sequences as received by each service antenna in an active subpopulation of the service antennas; and
    at each service antenna of the active subpopulation, using the channel coefficients to precode forward link signals or to partially decode reverse link signals.

2. The method of claim 1, wherein:
    the determination of channel coefficients is performed independently by each of the active service antennas and the resulting channel coefficients are locally stored at the respective service antennas; and
    each service antenna of the active subpopulation independently uses locally stored channel coefficients to precode forward link signals or to partially decode reverse link signals.

3. The method of claim 2, wherein the entire active subpopulation of service antennas synchronously transmits a plurality of messages, in which each message is destined for a respective access terminal and the same messages are transmitted from each of said active service antennas.

4. The method of claim 3, wherein prior to transmitting the plurality of messages, each service antenna precodes each message with one or more weight factors derived from the channel coefficients, and then sums the precoded messages.

5. The method of claim 2, further comprising:
    concurrently receiving a plurality of messages at each service antenna of the active population of service antennas, wherein each message is received on a reverse link from a respective one of the access terminals; and
    at each said service antenna, partially decoding each respective message of the plurality using one or more weight factors derived from the channel coefficients.

6. The method of claim 5, further comprising, at a network node communicatively connected to the distributed, cell-free network of service antennas:
    receiving the respective, partially decoded messages from the active service antenna subpopulation; and
    summing the partially decoded versions of each respective message as received from the respective active service antennas, thereby to recover a decoded version of each respective said message.

7. The method of claim 5, wherein, for each active service antenna after a first active service antenna, the partial decoding is carried out by:
    receiving a partially decoded version of each respective message from a preceding service antenna; and
    adding, to the received version, a further partially decoded version of the same message, wherein the further partially decoded version is formed using weight factors derived from locally stored channel coefficients.

8. The method of claim 1, wherein the allocation of pilot sequences comprises: providing a set of pilot sequences to be allocated;
    ordering the access terminals in a sequence that includes a first and subsequent access terminals; and
    allocating the pilot sequences in the ordered sequence, whereby there are a first and subsequent allocated pilot sequences; wherein:
    each pilot sequence allocated after the first is selected from those pilot sequences that remain in the provided set; and
    the selection is made so as to minimize a measure of contamination with those pilot sequences that have already been allocated.

9. The method of claim 8, wherein the measure of contamination is derived from slow-fading components of the channel coefficients between the active service antennas and the access terminals.

10. The method of claim 1, wherein each channel coefficient relates to a pair consisting of an access terminal and a service antenna, and the method further comprises pruning the pairs so as to define one or more active subpopulations of service antennas, wherein each active subpopulation is mutually active with a respective user population of access terminals.

11. The method of claim 10, wherein the pruning is based on geographical locations of service antennas and access terminals.

12. The method of claim 10, wherein the pruning is based on slow-fading components of the channel coefficients between service antennas and access terminals.

13. The method of claim 1, wherein at least some of the service antennas are implemented on wireless user terminals.

14. A network node communicatively connected to a distributed cell-free network of service antennas, the network node comprising a processor, wherein:

the processor is configured, using the service antennas, to allocate pilot sequences to a user population of access terminals by an allocation procedure that imposes local relative orthogonality of pilot sequences, wherein the allocating comprises:

generating a plurality of unitary matrices each associated with non-overlapping areas of a two-dimensional geographical space using a random field generating mechanism that imposes a controlled amount of spatial correlation for access terminals disposed in near proximity to each other, designating a row or column of each particular unitary matrix to a respective non-overlapping area that the particular unitary matrix is associated with, and allocating, to each particular access terminal, the row or column designated to a non-overlapping area where the particular access terminal is located;

the processor is configured to deliver the same plurality of messages to each service antenna of an active subpopulation of the network of service antennas for synchronized transmission by the active subpopulation, wherein each message is destined for a respective access terminal;

the processor is configured to receive, from at least one service antenna of an active subpopulation of the network of service antennas, a partially decoded version of a message from each access terminal in a user population of access terminals; and the processor is configured to recover a decoded version of each respective said message.

15. The network node of claim 14, wherein:

the processor is configured to receive, from each service antenna of an active subpopulation of the network of service antennas, a partially decoded version of a message from each access terminal in a user population of access terminals; and the processor is configured to sum the partially decoded versions of each respective message as received from the respective active service antennas, thereby to recover a decoded version of each respective said message.

* * * * *